(12) United States Patent
Pittman

(10) Patent No.: US 7,837,020 B2
(45) Date of Patent: Nov. 23, 2010

(54) LINERS CONFIGURED FOR COUPLING TO SUBSTRATES BY A PLURALITY OF TECHNIQUES AND METHODS

(76) Inventor: Michael F. Pittman, 213 W. Amsterdam Ave., Stansbury Park, UT (US) 84074

( * ) Notice: Subject to any disclaimer, the term of this patent is extended or adjusted under 35 U.S.C. 154(b) by 113 days.

(21) Appl. No.: 12/247,824

(22) Filed: Oct. 8, 2008

(65) Prior Publication Data

US 2010/0084244 A1 Apr. 8, 2010

(51) Int. Cl.
*B63B 3/00* (2006.01)
(52) U.S. Cl. ............... 193/2 R; 198/735.3; 198/735.5; 198/860.3; 52/506.05; 241/182
(58) Field of Classification Search ........... 193/2 R–24, 193/2 A–2 E; 198/735.3, 735.5, 860.3; 52/506.05; 241/182
See application file for complete search history.

(56) References Cited

U.S. PATENT DOCUMENTS

| | | | | |
|---|---|---|---|---|
| 3,981,117 A | * | 9/1976 | Dehlen | 52/509 |
| 4,528,783 A | * | 7/1985 | Muir | 144/355 |
| 5,055,336 A | * | 10/1991 | Davis | 428/137 |
| 5,735,377 A | * | 4/1998 | Herren | 193/33 |
| 6,082,646 A | * | 7/2000 | Clarke et al. | 241/182 |
| 6,129,967 A | * | 10/2000 | Young et al. | 428/49 |
| 6,189,280 B1 | * | 2/2001 | Malmberg | 52/506.05 |
| 6,250,450 B1 | * | 6/2001 | Howard | 193/2 R |
| 6,279,715 B1 | * | 8/2001 | Herren | 193/33 |
| 6,708,637 B1 | * | 3/2004 | Webster | 114/85 |
| 7,232,023 B2 | * | 6/2007 | Ellis et al. | 193/2 R |
| 7,584,582 B1 | * | 9/2009 | Hutter, III | 52/506.02 |
| 2008/0053785 A1 | * | 3/2008 | Neville et al. | 193/25 R |

* cited by examiner

*Primary Examiner*—Mark A Deuble
(74) *Attorney, Agent, or Firm*—Durham Jones & Pinegar, P.C.; Intellectual Property Law Group

(57) ABSTRACT

A system for lining a substrate, such as a rock chute, includes a liner with an engagement aperture that is configured to receive an adapter and that includes an internal ledge that enables use of the adapter to secure the liner to the substrate. Such a system may also include a base plate that may be secured to the substrate and that may be assembled with the liner to enable use of the adapter to attach the liner to the substrate. Methods for selecting a suitable adapter and using the adapter with the disclosed liner are also within the scope of the present invention.

18 Claims, 5 Drawing Sheets

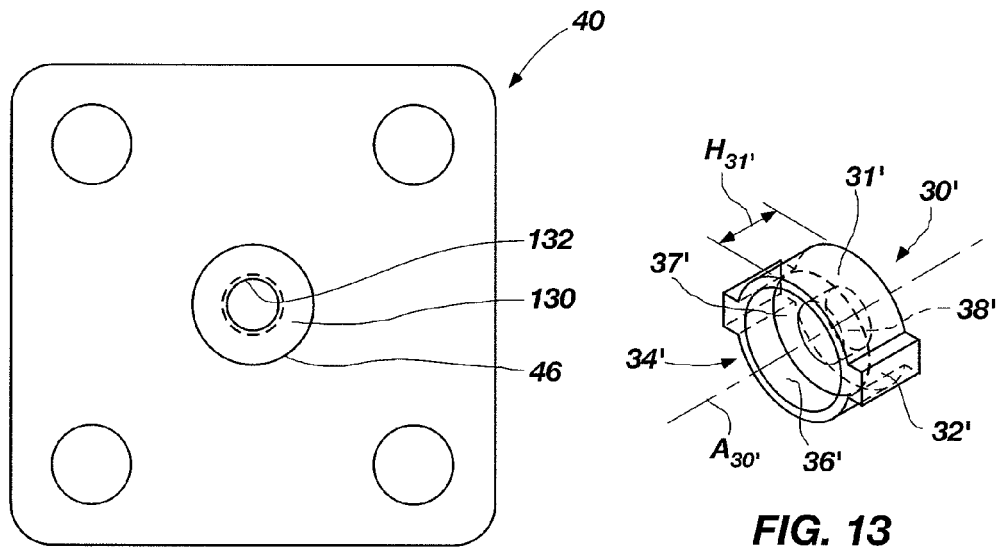
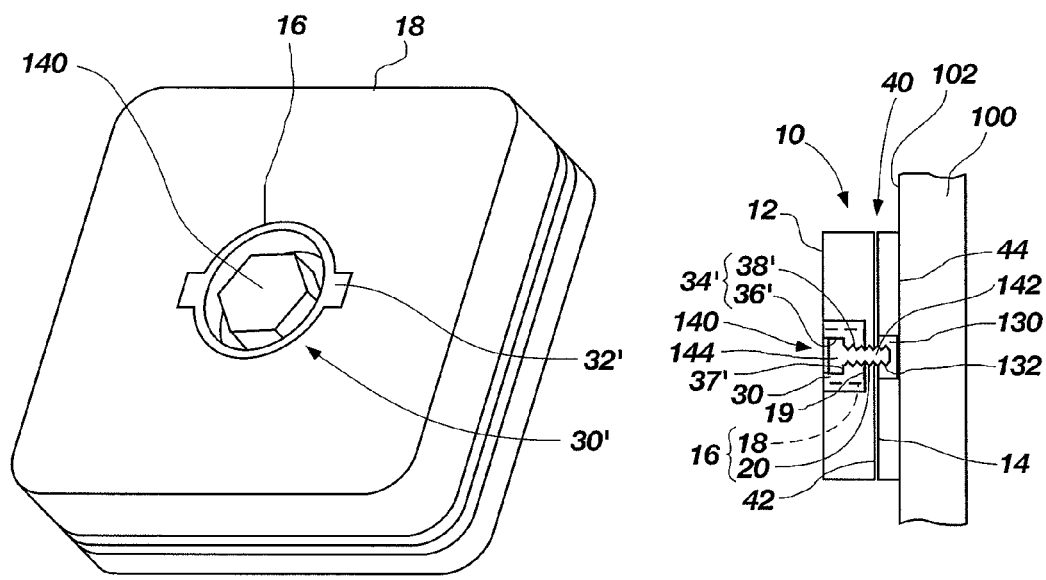

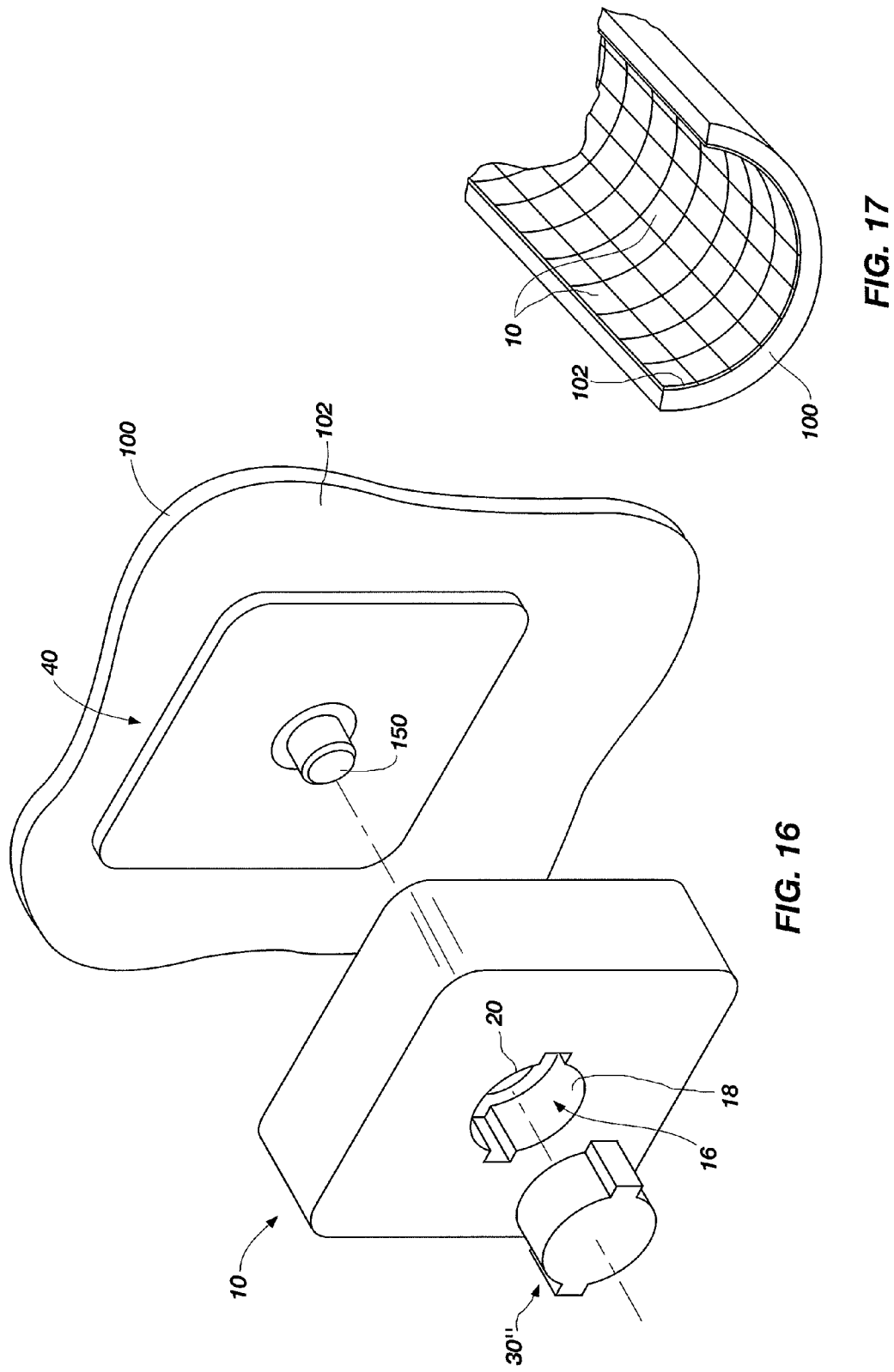

LINERS CONFIGURED FOR COUPLING TO SUBSTRATES BY A PLURALITY OF TECHNIQUES AND METHODS

TECHNICAL FIELD

The present invention relates generally to liners for substrates, such as rock chutes, and, more specifically, to liners that are configured to be coupled to substrates, such as rock chutes, by a plurality of techniques.

BACKGROUND OF RELATED ART

Chutes have long been used to transport materials from one location to another. The location at which a chute originates is typically uphill from the location at which the chute ends, or the chute's destination. This arrangement, along with a relatively smooth transport surface, allows for materials to be transported along the chute under force of gravity.

Among other purposes, chutes have been used to transport rock from mines. As rocks are typically dense and hard, they may dent a chute as they are introduced into the chute. The rough surfaces that are typically present on rocks that have been removed from a mine scratch and scrape away at the surface of a chute as gravity pulls them down the length of the chute. As a consequence, without some sort of protection, rock chutes wear very quickly.

In an effort to extend the useful lives of rock chutes and, thus, to avoid the expenses that would otherwise be associated with frequently replacing rock chutes, systems for lining rock chutes have been developed. In these systems, liners bear the majority of the impact and damage as rocks are transported along the length of a rock chute. Worn or damaged liners may periodically be removed from a chute and replaced with new liners. The cost of replacing liners is much less than the cost of replacing a rock chute.

The liners for many rock chutes consist of metal tiles that line the surfaces of the chute. There are a wide variety of techniques for securing the liners to the chute, but each rock chute is typically designed to receive liners in only one specific way. For example, a rock chute may include holes through which bolts may be positioned to engage complementary threading in the back side of a particular type and size of liner. Other chutes may include holes that are arranged to receive liners of a different size. Still other chutes may lack holes altogether, with solid liners instead being welded to the transport surfaces of the chutes. Thus, a liner that is designed to be coupled to a rock chute with a corresponding liner engagement system will not couple to a rock chute with a different liner engagement system. At some locations, rock chutes with a variety of liner engagement systems may be used, making liner replacement a difficult process.

SUMMARY

The present invention includes liners for substrates, such as rock chutes. A liner of the present invention is configured to be secured to a substrate regardless of any specific liner engagement technique for which the substrate is designed. For the sake of simplicity, such liners are also referred to herein as "multi-coupling liners."

In various embodiments, a liner according to the present invention may comprise an element that includes an engagement aperture. The engagement aperture may be configured to facilitate attachment of the liner to an interior surface of a substrate, such as the transport surface of a rock chute by a plurality of techniques. Such attachment may be effected by way of an internal ledge within the engagement aperture, as well as by a variety of adapters insertable into the engagement aperture.

Without limiting the scope of the present invention, the engagement aperture of a liner of the present invention may be configured to receive and prevent rotation of a nut, which is one embodiment of an adapter) with threading that corresponds to the threading of a bolt that may be positioned through a hole formed through the wall of a substrate. In some embodiments, the nut is designed specifically for use with the liner. A nut that has been designed specifically for use with a liner of the present invention may have an exterior (peripheral) configuration and dimensions that allow the nut to be longitudinally (relative to an axis passing through an aperture of the nut) inserted into a complementary engagement aperture and retained within the engagement aperture in a way that prevents rotation of the nut as a correspondingly threaded bolt is rotated from an exterior surface of the substrate to engage the nut.

The same liner may be used with a base plate from which a non-rotatable bolt protrudes, where the base plate is secured (e.g., by welding, etc.) to the interior surface of the substrate, the liner is placed over the base plate with the bolt extending into the engagement aperture, and another embodiment of adapter, also a nut with threading that corresponds to threading of the bolt, may be positioned within the engagement aperture and rotated to secure the liner to the base plate and, thus, to the interior surface of the substrate.

The engagement aperture of a liner of the present invention may also include features that enable the liner to be engaged by other types of engagement features, such as by receiving an adapter that enables use of a bolt from a front side of the insert, by receiving a magnetic adapter, or by receiving an adapter that facilitates attachment of the liner to a substrate in any other suitable manner.

Various embodiments of methods for securing liners to substrates, such as rock chutes, are also within the scope of the present invention. Such methods include inspecting a substrate to identify a technique by which liners are to be coupled to the substrate and use of the identified technique to couple a multi-coupling liner to the substrate. Because multi-coupling liners are used in such methods, there is no need to select a liner that is configured to be coupled to the substrate by the identified technique. Instead, an adapter that may be used with a multi-coupling liner to configure the multi-coupling liner for attachment by the identified technique may be selected, then used with the multi-coupling liner. In some embodiments, it may be necessary to remove one or more worn or damaged liners from a substrate prior to securing one or more replacement liners to the substrate.

Other aspects, as well as features and advantages of various embodiments, of the present invention will become apparent to those in the art through consideration of the ensuing description, the accompanying drawings, and the appended claims.

BRIEF DESCRIPTION OF THE DRAWINGS

In the drawings:

FIG. 12 is a top view of another embodiment of base plate, which includes a nut secured thereto;

FIG. 13 shows an embodiment of an adapter insertable into the engagement aperture of the embodiment of liner illustrated by FIGS. 1 through 4, with the adapter being configured to receive a bolt;

FIG. 14 is a frontal perspective view of an assembly including the embodiment of base plate shown in FIG. 12, the embodiment of liner shown in FIGS. 1 through 4, and the embodiment of adapter shown in FIG. 13 coupled to each other with a bolt;

FIG. 15 is a cross-sectional representation showing the assembly of FIG. 14 secured to a substrate;

FIG. 16 is a perspective assembly view of another embodiment of assembly, including an embodiment of a liner, a corresponding adapter, and a complementary base plate that enable magnetic coupling of the liner to a substrate; and FIG. 17 depicts a portion of a chute with a plurality of liners secured thereto.

DETAILED DESCRIPTION

Figure 1:
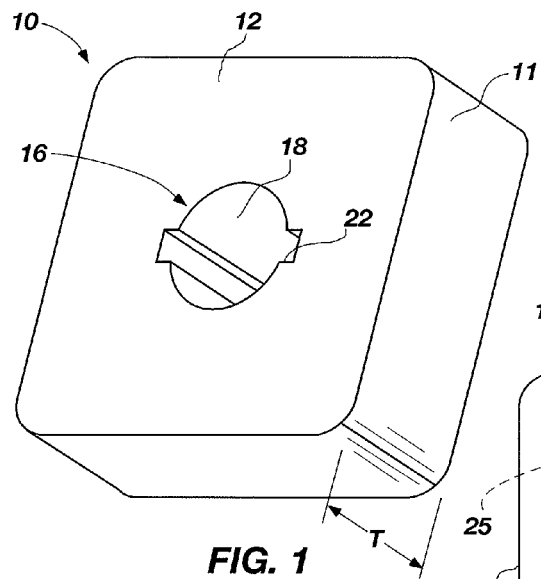
FIG. 1 is a frontal perspective view of an embodiment of a substrate liner of the present invention.
Figure 2:
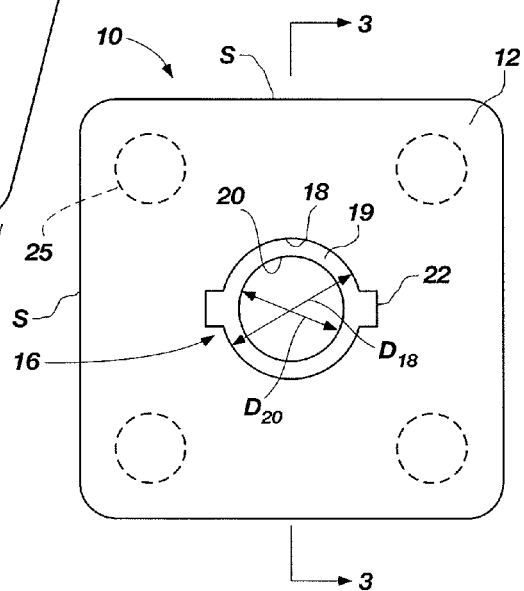
FIG. 2 is a top view of the liner of FIG. 1.
Figure 3:
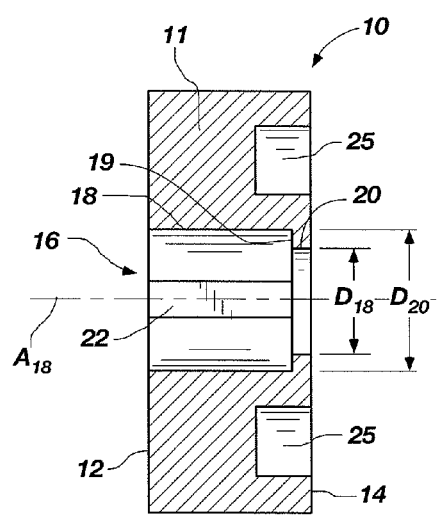
FIG. 3 is a cross-section taken through line 3-3 of FIG. 2.

FIGS. 1 through 4 depict an embodiment of liner 10 that incorporates teachings of the present invention. Liner 10 is configured to be secured to a substrate, such as a rock chute, by a plurality of different techniques. Liner 10 has a configuration that enables it to be secured in place upon a surface of a substrate adjacent to a plurality of other liners of the same or similar configuration in such a way that substantially an entire desired area of the substrate (e.g., substantially the entire transport surface of a rock chute, etc.) is covered and protected. In the depicted embodiment, liner 10 is a square tile with sides S that are about 6 inches long. Liner 10 has a thickness T of about 2¼ inches. Of course, liners with other dimensions and shapes (e.g., octagonal, hexagonal, rectangular, etc.) are also within the scope of the present invention.

The illustrated embodiment of liner 10 includes a body 11 with a front side 12 and a back side 14. Front side 12 is configured to form part of a lined surface of a substrate (e.g., a transport surface of a lined chute, etc.), while back side 12 is configured to be positioned against an interior surface of the substrate, or against an engagement mechanism that has been secured to the interior surface of the substrate.

An engagement aperture 16 extends completely through thickness T of body 11 of liner 10. An access end 18 of engagement aperture 16 opens to front side 12 of liner 10, while a base end 20 of engagement aperture 16 opens to back side 14 of liner 10. Engagement aperture 16 (or access end 18 and base end 20 thereof) may, in some embodiments, open to substantially central locations on front side 12 and back side 14.

In the depicted embodiment, both access end 18 and base end 20 of engagement aperture 16 are generally cylindrical openings that have aligned axes (i.e., they are in concentric alignment with each other). A diameter $D_{18}$ of access end 18 is larger than the diameter $D_{20}$ of base end 20. With such an arrangement, an appropriately sized coupling element, such as a nut or the head of a bolt, may be disposed within access end 18 without being able to pass through base end 20. Thus, when such a coupling element has been disposed within access end 18 and secured to a complementary coupling element that is held in place relative to a substrate adjacent to which back side 14 of liner 10 is positioned, the coupling element rests upon a ledge 19 at a border between access end 18 and base end 20, securing liner 10 to the substrate.

Access end 18 of engagement aperture 16 may be configured to prevent (e.g., have a shape that prevents) rotation of a coupling element disposed therein. In the depicted embodiment, access end 18 includes a pair of opposed, elongate recesses 22, which extend along at least a portion of the length of access end 18.

Figure 4:
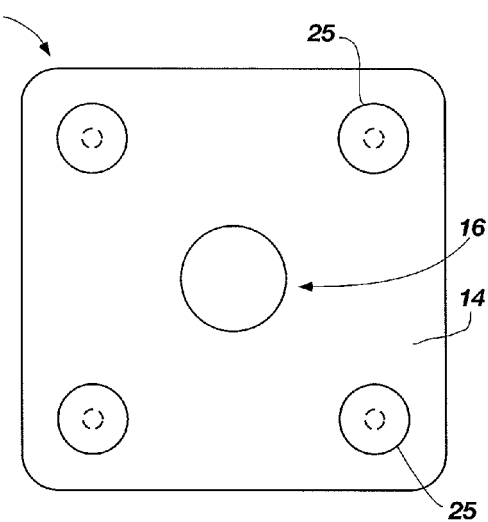
FIG. 4 is a bottom view of the liner of FIG. 1.
Figure 5:
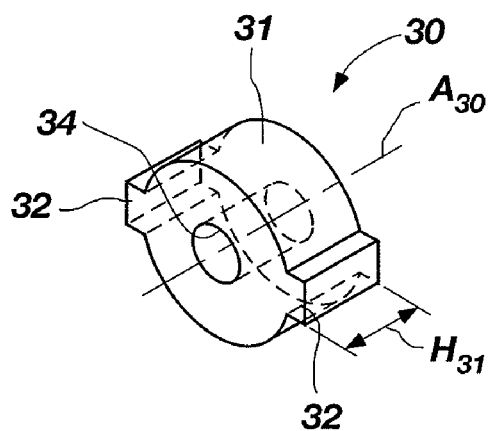
FIG. 5 is a perspective view of a nut configured for insertion into an engagement aperture of the embodiment of liner shown in FIGS. 1 through 4.
Figure 6:
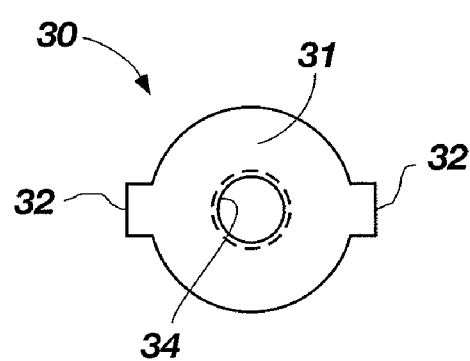
FIG. 6 is an end view of the nut shown in FIG. 5.

FIGS. 5 and 6 illustrate an embodiment of an engagement element 30, which is also referred to herein as an "adapter," that is configured complementarily to access end 18 of engagement aperture 16 (FIGS. 1 through 4) and that may be non-rotatably retained within access end 18. Engagement element 30 includes a generally cylindrical nut 31. Nut 31 includes a threaded aperture 34 located centrally therethrough, centered about a central axis $A_{30}$ of engagement element 30 and extending through the entire height $H_{31}$ of nut 31. Engagement element 30 also includes two diametrically opposed wings 32 that extend along at least a portion of height $H_{31}$ of nut 31. Wings 32 are configured to be received by elongate recesses 22 (FIGS. 1 through 3) of access end 18 of engagement aperture 16 as central axis $A_{30}$ of engagement element 30 is aligned with a central axis $A_{18}$ of access end 18 and engagement element 30 is inserted longitudinally into access end 18.

Figure 7:
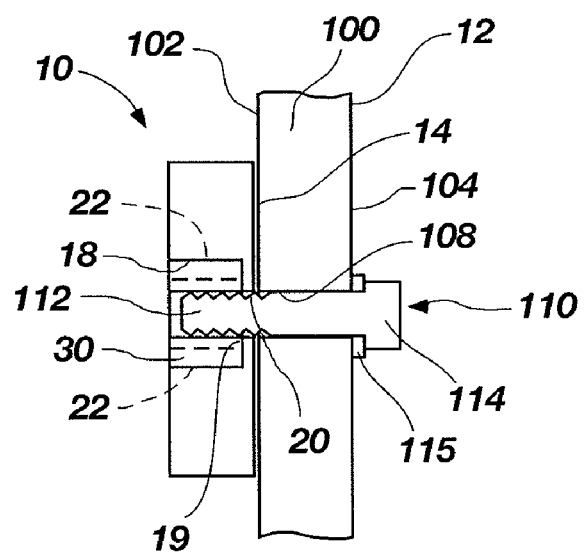
FIG. 7 is a cross-sectional representation illustrating an embodiment of the manner in which a liner, such as the embodiment depicted in FIGS. 1 through 4, may be secured to a substrate, such as a rock chute.

One embodiment of the manner in which liner 10 may be secured to a substrate 100, such as a rock chute, is depicted by FIG. 7. In such an embodiment, an engagement element 30 (see also FIGS. 5 and 6) that is complementary to and couples with elongate engagement element 110, such as the depicted nut, is aligned with access end 18 of engagement aperture 16 and introduced longitudinally into access end 18 from front side 12 of liner 10.

Back side 14 of liner 10 is disposed against an interior surface 102 of substrate 100 (e.g., a transport surface of a rock chute).

An engagement end 112 of elongate engagement element 110, such as the depicted bolt, is introduced into an aperture 108 through substrate 100 from an outer surface 104 of substrate 100. Once engagement end 112, for example, the threaded end of the depicted bolt, has been completely inserted into aperture 108 of substrate 100, a retention end 114 of elongate engagement element 110, such as the depicted bolt head, either abuts outer surface 104 or an intermediate element 115, such as the depicted washer, disposed between outer surface 104 of substrate 100 and retention end 114 of elongate engagement element 110. Thus, retention end 114 and, optionally, intermediate element 115, prevents elongate engagement element 110 from passing completely through aperture 108 through substrate 100.

In addition to extending through aperture 108 of substrate 100, engagement end 112 of elongate engagement element 110 extends into base end 20 of engagement aperture 16 of liner 10, and into access end 18 of engagement aperture 16. As engagement end 112 of elongate engagement element 110 is introduced into access end 18, engagement end 112 couples with the engagement element 30 that has been disposed within access end 18. In embodiments where elongate engagement element 110 comprises a bolt, the bolt may be rotated (e.g., with a wrench that engages its head, or retention end 114) while its threaded end (i.e., engagement end 112) is introduced into access end 18 of engagement aperture 16 so that the threads will engage complementary threads of the threaded aperture 34 of nut 31 (FIGS. 5 and 6) of engagement element 30.

Other embodiments of techniques for securing liner 10 (FIGS. 1 through 4) to a substrate may involve the use of additional apparatus.

Figure 8:
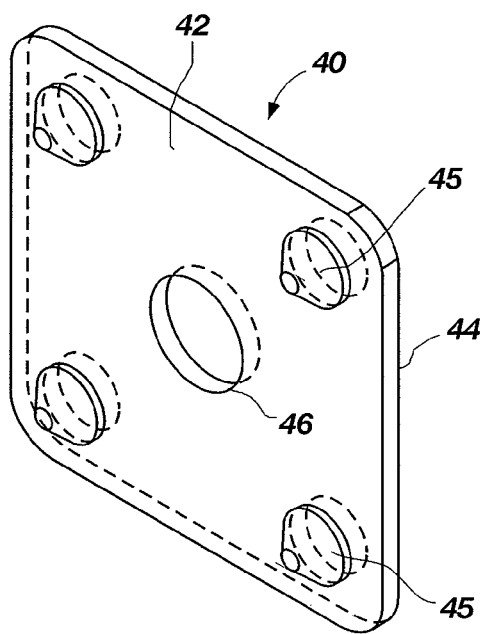
FIG. 8 is a frontal perspective view of an embodiment of a base plate to which an embodiment of a liner of the present invention may be assembled.
Figure 11:
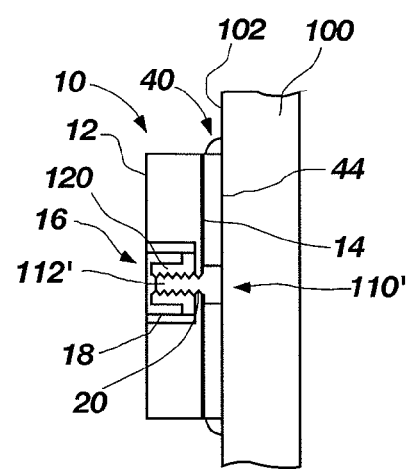
FIG. 11 is a cross-sectional representation showing the manner in which the embodiment of the assembly illustrated by FIG. 10 may be secured to a substrate.

One example of such an additional apparatus is the embodiment of base plate 40 shown in FIG. 8. Base plate 40 is a generally flat member that is configured for assembly with a liner. The depicted embodiment of base plate 40 is configured for assembly with the embodiment of liner 10 shown in FIGS. 1 through 4. Base plate 40 includes a front side 42, which is configured to be disposed against back side 14 of liner 10, and a back side 44, which is configured to be secured to against an interior surface 102 of a substrate 100 (FIG. 11).

Some embodiments of base plate 40 include alignment or stabilization features 45, which may align and/or stabilize a liner 10 (FIGS. 1 through 4) upon assembly of liner 10 with base plate 40. Alignment or stabilization features 45 are depicted in FIG. 8 as comprising four protrusions, one near each corner of base plate 40. However, in other embodiments, alignment or stabilization features 45 of base plate 40 may be configured differently (e.g., they may comprise apertures, recesses, or the like). Base plates with different numbers and arrangements of alignment features than those shown in FIG. 8 are, of course, also within the scope of the present invention. Alignment or stabilization features 45 may be configured to be received by four complementary alignment features 25 (FIG. 4) of liner 10 (e.g., apertures, recesses, etc.).

Referring again to FIG. 4, some embodiments of liner 10 include alignment features 25, which may facilitate alignment of liner 10 and its assembly relative to other features (e.g., other liners; apparatus, such as base plate 40, that enable coupling of liner 10 to a substrate; etc.) of or on a substrate. While alignment features 25 are depicted in FIG. 4 as comprising four apertures, one near each corner of liner 10, other embodiments (e.g., depressions, protrusions, etc.) of alignment features are also within the scope of the present invention. Liners with different numbers and arrangements of alignment features than those shown in FIG. 4 are, of course, also within the scope of the present invention.

With returned reference to FIG. 8, base plate 40 may, in some embodiments, include an attachment feature 46 that receives or facilitates positioning of an engagement element that is to be secured in place relative to base plate 40. In the embodiment illustrated by FIG. 8, attachment feature 46 comprises a circular aperture that extends through the center of base plate 40. Other embodiments of attachment features 46, as well as attachment features 46 that are located at different positions on base plate 40, are also within the scope of the present invention.

Figure 9:
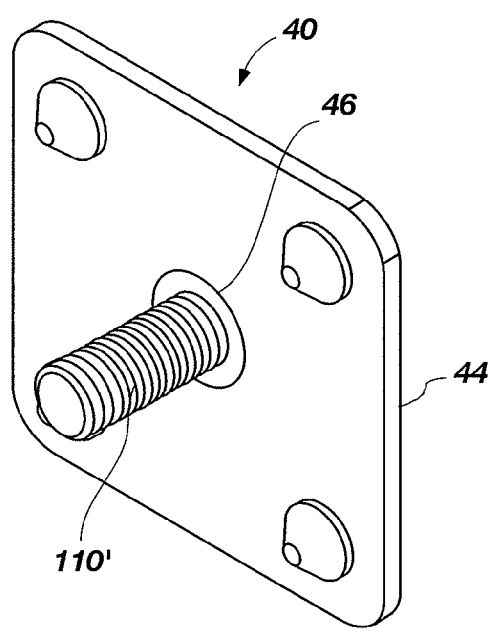
FIG. 9 is a frontal perspective view of the base plate of FIG. 8 with a bolt protruding therefrom and illustrating a nut that may be secured to the bolt.

FIG. 9, an elongate engagement element 110', such as the depicted bolt, is assembled with attachment feature 46 of base plate 40 so as to protrude from base plate 40's front side 42. Elongate engagement element 110' may be secured to base plate 40 in any suitable, known manner (e.g., by welding, an interference fit, by introducing an enlarged end, or head, of elongate engagement element 110' into a complementarily shaped (e.g., hexagonal, square, etc.) aperture in back side 44 of base plate 40 to prevent rotation of elongate engagement element 110', etc.).

Figure 10:
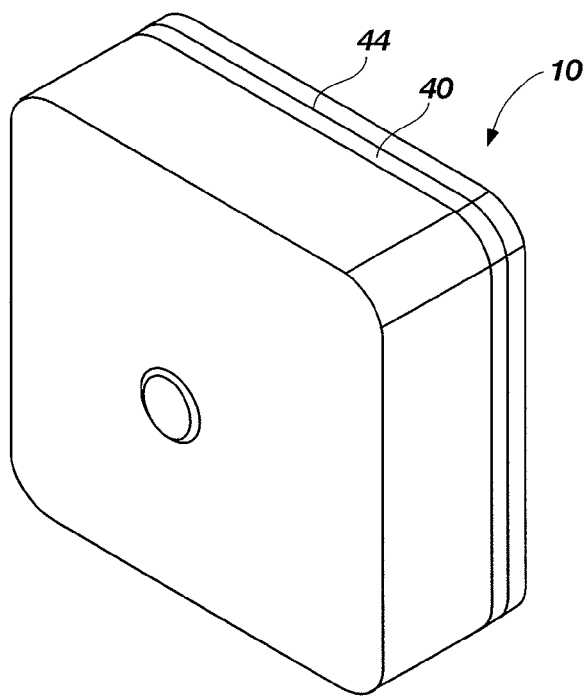
FIG. 10 is a frontal perspective of an assembly including the embodiment of liner depicted by FIGS. 1 through 4 coupled to the embodiment of base plate shown in FIGS. 8 and 9.

As shown in FIGS. 10 and 11, back side 44 of base plate 40 may be positioned against an interior surface 102 of a substrate 100, such as a rock chute, and secured thereto by known techniques (e.g., by welding, mechanical coupling elements, etc.). Liner 10 may be positioned over base plate 40 with its back side 14 facing front side 42 of base plate 40. As liner 10 is positioned over base plate 40, an engagement end 112' of elongate engagement element 110' is introduced into base end 20 of engagement aperture 16 of liner 10, then into access end 18 of engagement aperture. Liner 10 may be rotated about elongate engagement element 110' until alignment features 25 of liner 10 (FIG. 4) and alignment or stabilization features 45 of base plate 40 (FIGS. 8 and 9) interact with or engage one another.

With liner 10 in place upon base plate 40, another engagement element 120, which is complementary to and couples with engagement end 112' of elongate engagement element 110', or adapter, such as the depicted nut, is introduced into access end 18 from front side 12 of liner 10. Engagement element 120 engages (e.g., is screwed onto, etc.) engagement end 112' of elongate engagement element 110'. In the embodiment of liner 10 depicted by FIGS. 10 and 11, a diameter of access end 18 of engagement aperture 16 is large enough to accommodate engagement element 120, as well as to enable manipulation (e.g., rotation) of engagement element 120 (e.g., by also accommodating a wrench socket, etc.) so that engagement element 120 may be coupled to engagement end 112' of elongate engagement element 110'.

Referring now to FIG. 12, instead of an elongate engagement element 110' (FIG. 9), a short engagement element 130 may be secured to base plate 40. Short engagement element 130 may be assembled with and secured (e.g., by welding, an interference fit, by introducing short engagement element 130 into a complementarily shaped (e.g., hexagonal, square, etc.) aperture in back side 44 (FIG. 8) of base plate 40 to prevent rotation of short engagement element 130, etc.) to attachment feature 46 of base plate 40. In the depicted embodiment, short engagement element 130 is a nut with a coupling aperture 132 that is threaded.

FIG. 13 illustrates an embodiment of an adapter 30' that is configured to be disposed within access end 18 of engagement aperture 16 (FIGS. 1 through 4) of liner 10. In the illustrated embodiment, adapter 30' includes a generally cylindrical body 31'. An aperture 34', which is centered about a central axis $A_{30'}$ of adapter 30', extends centrally therethrough. Aperture 34' includes an outer end 36' and an inner end 38', both of which may be cylindrical in shape, which may be concentrically aligned along central axis $A_{30'}$. A ledge 37' is present at the border between outer end 36' and inner end 38'. Ledge 37' may be configured to abut against a retention end (e.g., a head, etc.) of an elongate engagement element 140 that is to be disposed within aperture 34' of adapter 30'.

In some embodiments, adapter 30' may be configured to be non-rotatably retained within access end 18 of engagement aperture 16 of liner 10 (FIGS. 1 through 4). In the specific embodiment shown in FIG. 10, adapter 30' includes two diametrically opposed wings 32' that extend along at least a portion of a height $H_{31'}$ of body 31'. Wings 32' are configured to be received by elongate recesses 22 of access end 18 of engagement aperture 16 as central axis $A_{30'}$ of adapter 30' is aligned with a central axis $A_{18}$ of access end 18 and adapter 30' is inserted longitudinally into access end 18, as illustrated in FIGS. 14 and 15.

As depicted by FIGS. 14 and 15, a back side 44 of a base plate 40 with a short engagement element 130 attached thereto may be positioned against and secured to (e.g., by welding, use of mechanical coupling elements, etc.) an interior surface 102 of a substrate 100, such as a rock chute. Liner 10 may be positioned over base plate 40 with its back side 14 facing front side 42 of base plate 40. As liner 10 is positioned over base plate 40, base end 20 of engagement aperture 16 of liner 10 is aligned with coupling aperture 132 of the short engagement element 130 that has been attached to base plate 40.

Adapter 30' is introduced into access end 18 of engagement aperture 16 of liner 10 with the outer end 36' of its aperture 34' opening to front side 12 of liner 10. Adapter 30' may be inserted into access end 18 until it rests against ledge 19 at the border between access end 18 and base end 20 of engagement aperture 16.

Thereafter, an engagement end 142 of an elongate engagement element 140 is introduced through outer end 36' and inner end 38' of aperture 34' and into coupling aperture 132 of short engagement element 130 to couple elongate engagement element 140 and short engagement element 130 to one another. When engagement end 142 of elongate engagement element 140 is introduced through aperture 34' of adapter 30' and into coupling aperture 132 of short engagement element 130, retention end 144 of elongate engagement element 140 is eventually positioned adjacent to, and may rest against or abut, ledge 37' within aperture 34'. This configuration holds adapter 30' against the ledge 19 between access end 18 and base end 20 of engagement aperture 16 of liner 10, thus holding liner 10 against base plate 40. Accordingly, when elongate engagement element 140 and short engagement element 130 are coupled to each other in the manner depicted in FIGS. 14 and 15, liner 10 is secured to base plate 40 and, thus, to substrate 100.

In the depicted embodiment, elongate engagement element 140 is a bolt, with its engagement end 142 comprising a threaded portion of the bolt. As the threaded portion of the bolt is introduced into and through aperture 34' of adapter 30' and into coupling aperture 132 of short engagement element 130, the bolt may be rotated (e.g., with a wrench, etc.) in such a way that threading of the bolt may engage complementary threading within coupling aperture 132. A head of the bolt (i.e., a retention end 144 of elongate engagement element 140) may abut against the ledge 37' within aperture 34' of adapter 30' to force adapter 30' against ledge 19 within engagement aperture 16 of liner 10, thus holding adapter 30' within access end 18 of engagement aperture 16 and securing liner 10 to base plate 40.

FIG. 16 depicts another embodiment of assembly that may be used to secure liner 10 to a substrate 100, such as a rock chute. In addition to liner 10, that assembly includes a base plate 40 that has been secured to an interior surface 102 of substrate 100. A lateral retention element 150, such as a post, may protrude from base plate 40. Lateral retention element 150 may be configured to be received by, or to be inserted into, base end 20 of engagement aperture 16 of liner 10.

The assembly shown in FIG. 16 also includes an adapter 30" that is configured to be received by access end 18 and, optionally, by a portion of base end 20 of engagement aperture 16. Adapter 30" is formed from a magnetic material. Once adapter 30" is disposed within engagement aperture 16 of liner 10 and liner 10 and base plate 40 are partially assembled, adapter 30" may retain liner 10 against base plate 40 (i.e., resist longitudinal movement of liner 10 away from base plate 40) and, thus, secure liner 10 both laterally and longitudinally in place relative to interior surface 102 of substrate 100.

As shown in FIG. 17, when a plurality of liners 10 have been secured to an interior surface 102 of a substrate 100, such as a rock chute, they may impart the lined interior surface 102 of substrate 100 with a tiled appearance.

When used to line a rock chute, a liner 10 of the present invention may be formed from a material that will withstand the rigors of receiving and transporting rocks under force of gravity. Such materials may, in some embodiments, have a hardness of about 500 Brinell (BHN) to about 700 BHN. Suitable materials include, but are certainly not limited to, alloys including magnesium and chromium, alloys that include magnesium and steel, ad other materials.

A liner 10 may be formed by a variety of known techniques, including, without limitation, casting a molten metal or a molten metal alloy.

Although the foregoing description contains many specifics, these should not be construed as limiting the scope of the present invention, but merely as providing illustrations of some embodiments. Similarly, other embodiments that are within the scope of the invention may also be devised. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed:

1. A system for lining rock chutes, comprising:
    an insert including a body with a front side and a back side, the back side configured to be positioned adjacent to an interior surface of a rock chute; and
    an engagement aperture extending through the body, the engagement aperture including an internal ledge enabling the engagement aperture to be used with a plurality of different engagement mechanisms for securing the body to the interior surface of the rock chute; and
    a plurality of adapters, each adapter of the plurality configured to be received by the engagement aperture and positioned against the internal ledge,
    at least one adapter of the plurality comprising a magnetic element insertable into the engagement aperture to enable the body to be magnetically secured in place over the interior surface of the rock chute.

2. The system of claim 1, wherein another adapter of the plurality comprises a nut configured to be retained within the engagement aperture in a manner that prevents the nut from rotating as a bolt is introduced into the engagement aperture from a back side of the body.

3. The system of claim 1, wherein another adapter of the plurality comprises a nut that rotates within the engagement aperture and that includes outer edges that are spaced a sufficient distance apart from an inner surface of the engagement aperture to accommodate a tool for securing the nut to a non-rotatable bolt extending into the engagement aperture through the back side of the body.

4. The system of claim 1, wherein another adapter of the plurality comprises an element configured to receive a bolt from the front side of the body.

5. The system of claim 1, further comprising:
    a base plate including a back side configured to be secured against the interior surface of the rock chute and a front side configured to be positioned against the back side of the body of the insert.

6. The system of claim 5, wherein a bolt protrudes from the front side of the base plate for insertion into the engagement aperture of the insert, the bolt being non-rotatably fixed in position relative to the base plate.

7. The system of claim 6, wherein an adapter of the plurality comprises a nut that rotates within the engagement aperture and that includes outer edges that are spaced a sufficient distance apart from an inner surface of the engagement aperture to accommodate a tool for securing the nut to the bolt.

8. The system of claim 5, wherein a nut is non-rotatably fixed in position relative to the base plate.

9. The system of claim 8, wherein an adapter of the plurality comprises an element configured to receive a bolt from the front side of the body.

10. The system of claim 5, wherein a lateral retention element protrudes from the base plate for insertion into the engagement aperture of the insert liner.

11. The system of claim 10, wherein the at least one adapter, when inserted into the engagement aperture, and the lateral retention element enable the body to be magnetically secured in place over the interior surface of the rock chute and to resist longitudinal movement of the liner away from the base plate.

12. A method for lining a rock chute, comprising:
identifying a coupling technique by which liners are to be secured to an interior surface of a rock chute;
selecting an adapter for use with the coupling technique;
inserting the adapter into an engagement aperture of a liner that is configured to receive different adapters that are useful in different coupling techniques;
coupling the adapter and the liner to the interior surface of the rock chute using the coupling technique; and
removing at least one worn or damaged liner from the interior surface of the rock chute, wherein coupling the adapter and the liner comprises replacing the at least one worn or damaged liner with a new liner.

13. The method of claim 12, further comprising:
selecting a base plate that corresponds to the adapter and that enables the adapter to secure the liner to the interior surface of the rock chute using the coupling technique; and
securing the base plate to the interior surface of the rock chute.

14. The method of claim 13, wherein securing the base plate to the interior surface of the rock chute comprises permanently securing the base plate to the interior surface.

15. The method of claim 12, wherein coupling comprises magnetically coupling the liner to the interior surface of the rock chute.

16. The method of claim 15, wherein coupling further comprises restricting lateral movement of the liner to the interior surface of the rock chute.

17. The method of claim 12, wherein coupling comprises mechanically engaging the adapter.

18. The method of claim 17, wherein mechanically engaging is enabled by securing a base plate to the interior surface of the rock chute.

* * * * *